Figure 1:
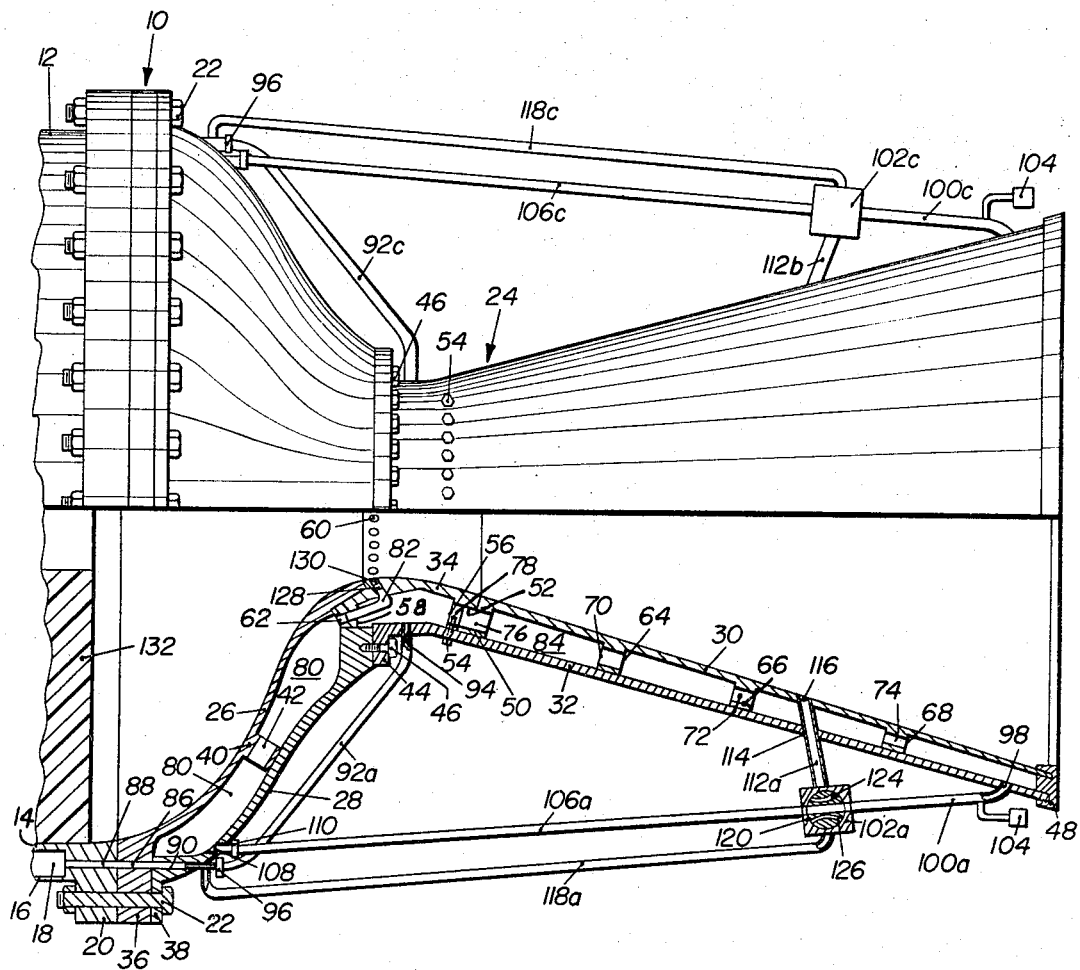

March 26, 1968     T. B. CARD     3,374,954

NOZZLE COOLING AND THRUST VECTOR CONTROL APPARATUS

Filed March 3, 1966

INVENTOR.
THEODORE B. CARD
BY Edwin D. Grant

ATTORNEY

United States Patent Office 3,374,954
Patented Mar. 26, 1968

3,374,954
NOZZLE COOLING AND THRUST VECTOR
CONTROL APPARATUS
Theodore B. Card, Brigham City, Utah, assignor to Thiokol Chemical Corporation, Bristol, Pa., a corporation of Delaware
Filed Mar. 3, 1966, Ser. No. 531,604
2 Claims. (Cl. 239—127.1)

This invention relates to rocket motors and more particularly to a rocket motor thrust nozzle provided with combined cooling and thrust vector control systems.

In the development of improved solid propellant rocket motors, the problem of providing suitable thrust nozzles therefor has become increasingly more difficult as operating temperatures of such rocket motors reach the melting points of the most heat-resistant materials now available. For example, operating a rocket motor at 7000° F. would preclude using even tungsten, the best known refractory metal available for use in nozzle throats, since tungsten melts at approximately 6150° F. Therefore, some means of cooling must be provided for rocket nozzles operated at temperatures near the melting point of the materials used therein. In addition, it is advantageous to incorporate into the thrust nozzle of a solid propellant rocket motor a system for thrust vector control that utilizes injection of a fluid laterally into the exhaust gases discharged therefrom (i.e., the so-called secondary injection system of thrust vector control), such a system eliminating the need for the heavy pivotal joints and actuating mechanisms that are required where thrust vector control is effected by means of a movable thrust nozzle. The invention disclosed herein provides a combination nozzle cooling and secondary injection thrust vector control apparatus which extends the operating temperature at which a solid propellant rocket motor can be operated, and which increases the effectiveness of secondary injection thrust vector control of such a rocket motor. Briefly described, a preferred embodiment of the invention comprises a thrust nozzle of double-wall construction, said nozzle having forward and aft chambers respectively extending forward and aft from the throat thereof, and means for passing fluid, under one operating condition of the embodiment, to the forward end of said aft chamber, thence rearward to the aft end of said aft chamber and through conduit means to said forward chamber, and finally to discharge ports circumferentially spaced about the throat of said nozzle. Additional conduit means are provided for passing fluid, under a second operating condition of the embodiment, from the aft end of said aft chamber to secondary injection ports circumferentially spaced about the inner wall of said nozzle adjacent the aft end thereof, and also for simultaneously passing fluid to said forward chamber and thence to said discharge ports spaced about the throat of said nozzle.

It is accordingly a broad object of this invention to provide combined nozzle cooling and thrust vector control apparatus for a rocket motor.

Another object of this invention is to provide a combined rocket motor nozzle cooling and thrust vector control apparatus that is light in weight and inexpensive to manufacture yet highly efficient in operation.

Figure 2:
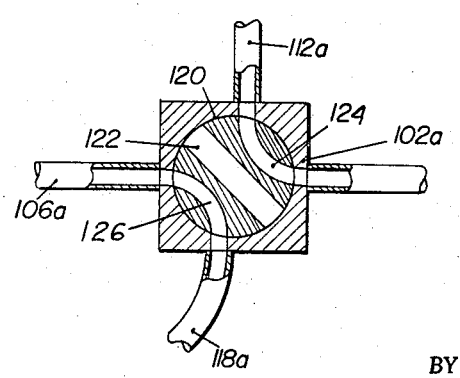

Other objects and advantages of this invention will become apparent by consideration of the following description of a preferred embodiment thereof, in which reference is made to the accompanying drawings wherein:

FIGURE 1 is a view illustrating the aft end of a rocket motor incorporating the preferred embodiment of the invention, one-half of the drawing being in longitudinal section to show the internal structure of components; and FIGURE 2 is a sectional view of one of the valves of said embodiment, illustrating the valve as it appears when fluid is being injected into the thrust nozzle of said rocket motor to change its direction of travel.

Throughout the specification and drawings the same reference numbers refer to the same parts.

In FIGURE 1 is illustrated a rocket motor, generally designated by reference number 10, having a tubular casing 12 formed with inner and outer walls 14, 16 between which is an annular space 18. Casing 10 is provided with a radially projecting, circumferentially extending flange 20 to which is fixedly secured, as by means of a plurality of bolts 22, the mating flange of a double-wall thrust nozzle generally designated by reference number 24. More particularly, nozzle 24 is comprised of five members, namely, a first member 26 which forms the inner, forward wall of said nozzle, a second member 28 which forms the outer forward wall of said nozzle, a third member 30 which forms the inner, rear wall of said nozzle, a fourth member 32 which forms the outer, rear wall of said nozzle, and a fifth member 34 which forms the throat of said nozzle. Members 26 and 28 are provided with integral, radially projecting, circumferentially extending flanges 36, 38, respectively, that are fixedly secured to flange 20 by bolts 22 in the illustrated tandem relation. Member 26 is also provided with an integral, outwardly projecting, circumferentially extending shoulder 40 that serves as a support and spacer for member 28, said shoulder having a plurality of circumferentially spaced holes 42 extending therethrough. The forward end of member 32 terminates in a radially projecting, circumferentially extending flange 44 that is joined to the aft end of member 28 by means of a plurality of screws 36, the aft end of said member being threadedly engaged with an outwardly projecting, circumferentially extending closure member 48 fixedly attached to the aft end of member 30. The forward end of member 30 is provided with a circumferentially extending shoulder 50 the inner, forwardly-projecting surface 52 of which abuts the outer, aft end surface of member 34 ("outer" and "inner" being used herein with reference to the longitudinal axis of nozzles 24). Member 34 is in turn fixedly secured to member 32 by means of plurality of screws 54 which extend through holes in said member 32 and are threadedly engaged within holes in a circumferentially extending shoulder 56 formed on member 34 and spaced a short distance from the aft edge thereof. The forward end of member 34 conformably engages the outer, aft end surface of member 26, and the outer surface of a radially projecting, circumferentially extending shoulder 58 integrally formed on said member 34 abuts the longitudinally extending (i.e., parallel to the longitudinal axis of nozzle 24) end surface of member 28. Each of a plurality of circumferentially spaced cooling ports 60 extends through member 34 adjacent the forward edge thereof, these ports being equidistant from said forward edge. An equal number of holes 62 extend through shoulder 58 of said member 34, these holes being located so that they are longitudinally aligned with ports 60. Integrally formed on member 30 and spaced apart longitudinally thereof are three circumferentially extending shoulders 64, 66, 68 each of which contains a plurality of circumferentially spaced holes 70, 72, 74. Shoulder 50 also contains a plurality of circumferentially spaced holes 76 each of which is aligned with a respective one of a plurality of holes 78 formed in shoulder 56 of member 34. Each port 60 is communicatively connected with the forward chamber 80 of nozzle 24 by means of a length of tubing 82 which is fixedly engaged within the outer (i.e., with respect to the longitudinal axis of nozzle 24) end of said port and within a respective one of the holes 62 in shoulder 58, said tubing extending into the forward portion of the aft chamber 84 of said nozzle.

It will thus be seen that nozzle 24 has an inner wall (i.e., members 26, 34 and 30) and an outer wall (i.e., members 28 and 32) which are disposed in spaced, concentric relation and sealably joined at the forward and aft ends thereof, with an annular partition (i.e., shoulder 58) extending between said walls adjacent the throat of said nozzle and dividing the annular space between said walls into forward and aft chambers 80, 84 respectively.

In the preferred embodiment of the invention herein described, four passages 86 extend through flange 36 of thrust nozzle 24 and are evenly spaced circumferentially thereof, each of these passages communicating with a passage 88 that extends longitudinally through the aft end of casing 12 to space 18 therein and with a passage 90 that extends longitudinally through the forward end of member 28. A first conduit 92a through 92d (only two of which are illustrated) is fixedly engaged at one end within each passage 90 and at the other end within a respective one of four fluid supply ports 94 which extend through the forward portion of member 32 and are evenly spaced circumferentially thereof, each of said first conduits having a check valve 96 positioned therein. At the aft end of said member 32 are four pressurized-fluid outlet ports 98 which are also evenly spaced circumferentially of nozzle 24 and in each of which is fixedly engaged one end of a second conduit 100a through 100d (only two of which are illustrated), the other end of each second conduit 100a through 100d being fixedly connected to a valve 102a through 102d (only two of which are illustrated). A relief valve 104 is communicatively connected to each second conduit 100a through 100d. A third conduit 106a through 106d (only two of which are illustrated) is fixedly connected at one end to each of the valves 102a through 102d and at the other end is fixedly engaged within a respective one of four coolant supply ports 108 which extend through the forward portion of member 28 and are evenly spaced circumferentially thereof, a check valve 110 being included in each of said third conduits. A fourth conduit 112a through 112d (only two of which are illustrated) is also fixedly connected at one end to each of the valves 102a through 102d, extends through a hole 114 in member 32, and is fixedly engaged within a respective one of four injection ports 116 which extend through member 30, and which are evenly spaced circumferentially thereof and equidistant from the aft end of nozzle 24. Lastly, a fifth conduit 118a through 118d (only two of which are illustrated) is fixedly connected at one end to each of the valves 102a through 102d and at the other end to a respective one of the first conduits 92a through 92d adjacent its point of attachment to member 28 and forward of the check valve 96 therein.

As illustrated in FIGURES 1 and 2, each of the valves 102a through 102d is provided with a plug 120 having three passages 122, 124, 126 formed therein. The valves are also provided with means (not shown) by which the plugs 120 thereof can be individually rotated between the two configurations thereof which are illustrated in FIGURES 1 and 2 respectively.

It will be recognized by persons skilled in the art of rocket motors that the above-described components of the preferred embodiment of this invention can be made of many different, well-known materials. Preferably member 34 is formed of tungsten or other heat-resistant material.

Prior to firing of rocket motor 10, the annular space 18 within casing 12 is filled with water or other cooling fluid. Space 18 is pressurized by suitable conventional means such as a pump (not shown) and water is forced through first conduits 92a through 92d to the aft chamber 84 of nozzle 24, and thence through second conduits 100a through 100d, passages 122 in valves 102a through 102d (each of which is in the first configuration thereof illustrated in FIGURE 1), and third conduits 106a through 106d to the forward chamber 80 of said nozzle. Positioned in each cooling port 60 are a porous diffuser plug 128 formed of a heat-resistant material, such as a ceramic, and a thin seal plug 130 formed of a material that will melt when the solid propellant charge 132 of rocket motor 10 is ignited and the high-temperature combustion products thereof pass through nozzle 24. Thereafter, heat transferred through member 30 of nozzle 24 turns the water within the aft chamber 84 of said nozzle into steam, which passes through second conduits 100a through 100d, passages 122 in valves 102a through 102d, and third conduits 106a through 106d to the forward chamber 80 of said nozzle. The steam, or steam and water, in chamber 80 then passes through the sections of tubing 82 to cooling ports 60, where it is diffused by diffuser plugs 128 and discharged into the gas stream flowing through nozzle 24, thereby cooling the throat portion of said nozzle. Make-up water flows from the coolant reservoir in casing 12 through first conduits 92a through 92d to the forward end of aft chamber 84 as steam passes out of said chamber through second conduits 100a through 100d. Steam pressure within conduits 100a through 100d and conduits 106a through 106d is maintained below a desired level by the relief valves 104.

When the thrust vector of rocket motor 10 is required to be changed, one or more of the valves 102a through 102d can readily be actuated to bring the plug or plugs 120 thereof to the second configuration thereof illustrated in FIGURE 2. Thereafter steam from aft chamber 84 passes through the passage 124 in each actuated valve to the fourth conduit 112 connected thereto and is discharged from the injection port 116 in which the end of said conduit is engaged, thereby exerting a lateral force on nozzle 24. In each of the actuated valves 102a through 102d, the third and fifth conduits 106, 118 connected thereto are placed in communication through passage 126 in the plug 120 of said valve. Therefore, water from space 18 in casing 12 flows through said third and fifth conduits connected to the actuated valves to the forward chamber 80 of nozzle 24. Steam also continues to flow from the aft chamber 84 to the forward chamber 80 of nozzle 24 through second and third conduits 100, 106 connected to the valves 102 which are not actuated and which thus remain in the first configuration thereof illustrated in FIGURE 1. Consequently, cooling of the throat of nozzle 24 continues while thrust vector control of rocket motor 10 is being achieved by secondary injection through one or more of the injection ports 116.

It will be recognized that the components required for the disclosed nozzle cooling and thrust vector control apparatus are light in weight and uncomplicated in structure. Since the invention eliminates the need for heavy pivotal joints and actuating mechanisms employed with movable nozzles, it provides a considerable increase in the payload that can be carried by a rocket motor in which it is utilized. Furthermore, the circulation of coolant between the double walls of a nozzle constructed in accordance with the invention makes possible operation of a rocket motor at a higher temperature than could be achieved heretofore and also makes possible the use of thin walls in the construction of a thrust nozzle for such high-temperature operation.

It will also be recognized that certain modifications can be made in the components of the apparatus illustrated in FIGURES 1 and 2 without, however, departing from the principles of the invention. For example, the sections of tubing 82 which communicatively connect cooling ports 60 with the forward chamber 80 of nozzle 24 could readily be replaced by passages formed in the forward portion of member 34 itself (in which construction the holes 62 in shoulder 58 of said member 34 would be eliminated). While the invention is particularly advantageous when employed with solid propellant rocket motors, its use is obviously not restricted to such rocket motors. Therefore, the scope of the invention is to be considered as being limited only by the terms of the appended claims.

What is claimed is:

1. In a rocket motor, nozzle cooling and thrust vector control apparatus comprising:

a convergent-divergent nozzle having inner and outer walls disposed in spaced, concentric relation and sealably joined at the forward and aft ends thereof, an annular partition extending between said walls adjacent the throat of said nozzle and dividing the annular space between said walls into forward and aft chambers, said nozzle being provided with a plurality of circumferentially spaced cooling ports formed in said inner wall at said throat and in communication with said forward chamber, a plurality of circumferentially spaced injection ports formed in said inner wall aft of said throat, at least one fluid supply port formed in said outer wall and in communication with the forward portion of said aft chamber, a plurality of circumferentially spaced pressurized-fluid outlet ports formed in said outer wall and in communication with the aft portion of said aft chamber, and a plurality of circumferentially spaced coolant supply ports formed in said outer wall and in communication with said forward chamber;

fluid reservoir and first conduit means carried by said rocket motor, said means being connected to said supply port and adapted to supply fluid to said aft chamber under pressure;

a plurality of second conduit means each communicatively connected to a respective one of said pressurized-fluid outlet ports;

a plurality of third conduit means each communicatively connected to a respective one of said coolant supply ports;

a plurality of fourth conduit means each extending through said outer wall and communicatively connected to a respective one of said injection ports;

a plurality of fifth conduit means each communicatively connected to said first conduit means; and a plurality of valves each connected to a respective one of said second, third, fourth and fifth conduit means and operable between a first configuration thereof wherein said second and third conduit means connected thereto are in communication and a second configuration thereof wherein said second and fourth conduit means, and said third and fifth conduit means, connected thereto are respectively in communication.

2. Nozzle cooling and thrust vector control apparatus as defined in claim 1 including a plurality of pressure relief valves each communicatively connected to a respective one of said second conduit means and adapted to vent fluid therefrom when pressure therein reaches a predetermined level.

References Cited

UNITED STATES PATENTS

| | | | |
|---|---|---|---|
| 3,099,909 | 8/1963 | Newcomb | 239—127.1 |
| 3,116,603 | 1/1964 | Hausmann | 60—267 X |

M. HENSON WOOD, JR., *Primary Examiner.*

M. Y. MAR, *Assistant Examiner.*